United States Patent
Na

(10) Patent No.: US 9,995,200 B2
(45) Date of Patent: Jun. 12, 2018

(54) TEMPERATURE CONTROL DEVICE FOR ENGINE

(71) Applicant: Hyundai Motor Company, Seoul (KR)

(72) Inventor: Jeong Hyun Na, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 82 days.

(21) Appl. No.: 14/838,967

(22) Filed: Aug. 28, 2015

(65) Prior Publication Data

US 2016/0160738 A1 Jun. 9, 2016

(30) Foreign Application Priority Data

Dec. 8, 2014 (KR) ................. 10-2014-0175172
Mar. 25, 2015 (KR) ................. 10-2015-0041567

(51) Int. Cl.

| F01P 7/16 | (2006.01) |
|---|---|
| F02M 31/10 | (2006.01) |
| F02M 26/17 | (2016.01) |
| F02M 31/04 | (2006.01) |
| F02M 21/02 | (2006.01) |
| F01P 7/14 | (2006.01) |

(52) U.S. Cl.
CPC ............ *F01P 7/16* (2013.01); *F02M 21/0215* (2013.01); *F02M 26/17* (2016.02); *F02M 31/042* (2013.01); *F02M 31/105* (2013.01); *F01P 2007/146* (2013.01); *Y02T 10/126* (2013.01); *Y02T 10/32* (2013.01)

(58) Field of Classification Search
CPC .... F02D 41/0002; F02M 26/33; F02M 26/14; F02M 26/10; F02M 26/17; F02M 26/30; F02M 35/10222; F02M 35/10268; F02B 29/0418
See application file for complete search history.

(56) References Cited

U.S. PATENT DOCUMENTS

| 4,117,814 A * | 10/1978 | Takahashi | F02D 21/08 123/568.19 |
|---|---|---|---|
| 7,621,262 B2 * | 11/2009 | Zubeck | B60W 20/40 123/543 |
| 7,625,257 B1 * | 12/2009 | Broman | B63H 20/26 440/89 B |
| 8,056,338 B2 * | 11/2011 | Joergl | F02B 37/00 123/568.11 |
| 8,495,874 B2 * | 7/2013 | Lippa | F02M 26/36 123/568.11 |

(Continued)

FOREIGN PATENT DOCUMENTS

| JP | 10-252460 A | 9/1998 |
|---|---|---|
| JP | 2007-176392 A | 7/2007 |

(Continued)

*Primary Examiner* — Long T Tran
(74) *Attorney, Agent, or Firm* — Morgan, Lewis & Bockius LLP

(57) ABSTRACT

A temperature control device for the engine may include an air heater configured to heat air introduced into a throttle valve by a flow of engine cooling water, and a valve apparatus configured to cut off the flow of the engine cooling water passing through the air heater at a set temperature range or more, without being supplied with a separate control signal.

10 Claims, 4 Drawing Sheets

(56) References Cited

U.S. PATENT DOCUMENTS

| | | | |
|---|---|---|---|
| 2012/0167862 A1* | 7/2012 | Nishimori | F02M 25/0795 123/568.12 |
| 2014/0283765 A1* | 9/2014 | Naito | F01P 3/12 123/41.09 |
| 2014/0352668 A1* | 12/2014 | Styles | F02M 31/042 123/552 |

FOREIGN PATENT DOCUMENTS

| | | |
|---|---|---|
| JP | 2013-113129 A | 6/2013 |
| KR | 10-2002-0081627 A | 10/2002 |
| KR | 10-2008-0048740 A | 6/2008 |
| KR | 10-2010-0061177 A | 6/2010 |
| KR | 10-2010-0131810 A | 12/2010 |
| KR | 10-2012-0062086 A | 6/2012 |

* cited by examiner

TEMPERATURE CONTROL DEVICE FOR ENGINE

CROSS REFERENCE TO RELATED APPLICATION

This application claims priority to Korean Patent Applications No. 10-2014-0175172, filed on Dec. 8, 2014 and No. 10-2015-0041567, filed on Mar. 25, 2015, the entire contents of which are which incorporated herein for all purposes by this reference.

BACKGROUND OF THE INVENTION

Field of the Invention

The present invention relates to a temperature control device for an engine, and more particularly, to a technology of controlling a temperature of a throttle body of the engine to which an exhaust-gas recirculation (EGR) is applied.

Description of Related Art

In an engine to which an EGR re-circulating exhaust gas of the engine to a front end of a throttle body of an intake system of the engine is applied, when a temperature of air received into the intake system is a sub-zero temperature like a winter season, a phenomenon that moisture included in EGR gas re-circulated into the intake system of the engine freezes by meeting air below zero occurs, in which the freezing phenomenon hinders a valve flap included in the throttle body from rotating to cause an abnormal phenomenon which makes it difficult to smoothly control a fuel-air mixture introduced into the engine, reduces an output of the engine, and the like.

Generally, the fuel-air mixture or air received into the engine needs to be supplied to the engine in a low temperature state if possible within a range in which side effects due to the freezing phenomenon described above do not occur to improve filling efficiency of the engine, thereby obtaining the higher output of the engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a temperature control device for an engine capable of preventing a motion obstruction phenomenon of a valve flap from occurring due to moisture freezing in an engine to which EGR is applied while air mixed with EGR gas passes through a throttle valve to prevent air passing through the throttle valve from being excessively heated while securing smooth and stabilized workability of the engine, thereby preventing filling efficiency of the engine from being unnecessarily reduced.

According to various aspects of the present invention, a temperature control device for the engine may include an air heater configured to heat air introduced into a throttle valve by a flow of engine cooling water, and a valve apparatus configured to cut off the flow of the engine cooling water passing through the air heater at a set temperature range or more, without being supplied with a separate control signal.

The air heater may be provided between a position where an exhaust gas recirculation (EGR) passage, through which EGR gas is supplied, is connected to an intake pipe of the engine and a position where a valve flap of the throttle valve connected to the intake pipe is disposed.

A first end of the intake pipe may be coupled to a throttle body which is provided with the throttle valve therein, and the air heater may be integrally formed at the first end of the intake pipe which is coupled to the throttle body.

The air heater may include a heating channel which is formed in an arc shape within the first end of the intake pipe so as to provide the flow of cooling water while enclosing a circumference of air introduced into the throttle body, a supply port provided at the first end of the intake pipe so as to supply the cooling water to the heating channel, and a discharge port provided at the first end of the intake pipe so as to discharge the cooling water through the heating channel.

The air heater may be coupled between an end of the intake pipe and a throttle body and may include a heating adapter of which a center is provided with an air hole through which air passes from the intake pipe to the throttle body, and the heating adapter may be provided with a heating channel so as to allow cooling water to flow while enclosing a circumference of the air hole and may be provided with a support port which supplies the cooling water to the heating channel and a discharge port which discharges the cooling water through the heating channel.

The heating adapter may be integrally provided with an extending pipe which protrudes to be inserted into the throttle body from an edge portion of the air hole to heat air passing through the air hole over a long period of time while increasing a heat transfer to the throttle valve due to conduction.

The air heater may be integrally provided at an upstream side of the throttle valve within a throttle body.

The valve apparatus may include a thermostat which cuts off cooling water discharged from the engine through an engine passage from flowing in a heat radiation passage toward a radiator when a temperature of the cooling water is less than the set temperature range and cuts off the cooling water from the engine passage from flowing through a bypass passage for directly supplying the cooling water to a water pump while bypassing the radiator when the temperature of the cooling water exceeds the set temperature range.

The thermostat which is the valve apparatus may be configured to cut off a circulation passage through which cooling water passing through the air heater is connected to the bypass passage when a second valve cuts off the bypass passage through which the cooling water is directly supplied to the water pump when the temperature of the cooling water exceeds the set temperature range.

The circulation passage may be formed to communicate with a surface of a valve seat seated when the second valve of the thermostat cuts off the bypass passage.

The engine may be a compressed natural gas (CNG) engine using CNG as fuel, the air heater may be disposed to be supplied with the cooling water passing through an air compressor to cool the air compressor compressing air to be used in a vehicle to heat air supplied to the throttle valve, the cooling water passing through the air heater and the valve apparatus may be directly supplied to a water pump which is configured to pump the cooling water to the engine, and the air compressor is disposed to be supplied with the cooling water passing through the engine.

The cooling water passing through the air compressor may be supplied to a fuel heater which is configured to heat the CNG to be supplied to the engine, in addition to the air heater, and the cooling water passing through the fuel heater may be transferred to the water pump.

According to various aspects of the present invention, a thermostat for an engine may include a first valve configured to cut off a heat radiation passage, through which cooling water discharged from the engine through an engine passage is supplied to a radiator, from the engine passage when a temperature of the cooling water is less than a set temperature range, a second valve configured to interlock with the first valve and cut off a bypass passage, through which the cooling water discharged from the engine through the engine passage is directly supplied to a water pump, from the engine passage when the temperature of the cooling water exceeds the set temperature range, and a circulation port having an end opened on a surface of a valve seat of the second valve so as to transfer the cooling water discharged from the engine through a separate passage from the engine passage and allow the cooling water to flow in the bypass passage and then to be cut off as soon as the second valve cuts off the bypass passage.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
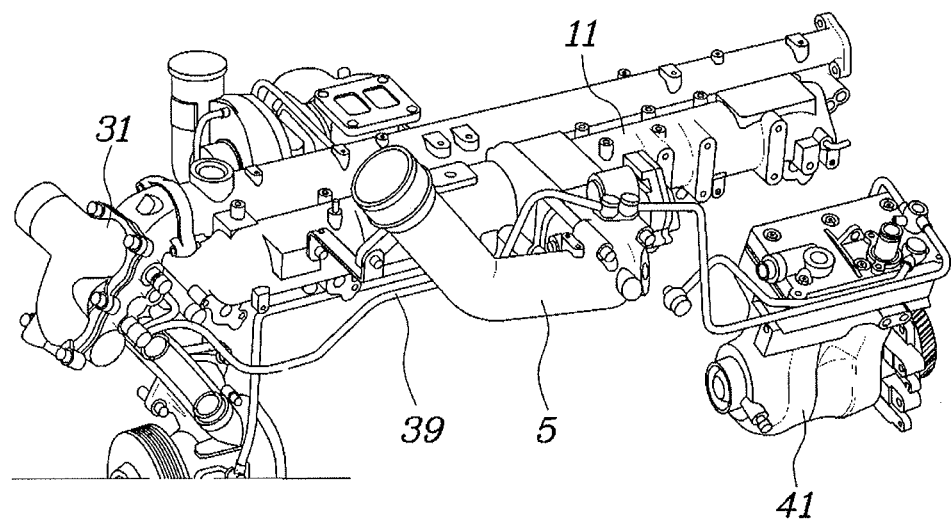
FIG. 1 is a diagram illustrating a portion of a compressed natural gas (CNG) engine to which the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1 to FIG. 8, a temperature control device for an engine according to various embodiments of the present invention includes an air heater 1 provided to heat air introduced into a throttle valve by a flow of engine cooling water and a valve apparatus 30 provided to cut off the flow of engine cooling water passing through the air heater 1 at a set temperature range or more without being supplied with a separate control signal.

In this configuration, the air heater 1 is provided between a position where an EGR passage 3 through which EGR gas is supplied is connected to an intake pipe 5 of the engine E and a position where a valve flap of the throttle valve 7 connected to the intake pipe 5 is installed.

That is, even though EGR gas is mixed under the situation in which air having a sub-zero temperature is introduced through an intake pipe 5, the air heater 1 heats the air to prevent a valve flap of the throttle valve 7 from freezing, thereby preventing various kinds of side effects like the reduction in output from the engine E which occurs due to the hindrance of motion of the valve flap, and so on and the valve apparatus 30 cuts off the flow of cooling water of the air heater 1 under the situation that the engine E is sufficiently warmed up to eliminate the freezing concerns of the throttle valve 7 so as to prevent the air introduced in to the engine E from being unnecessarily heated, thereby preventing filling efficiency of the engine E from being reduced due to temperature rising of received air.

Figure 2:
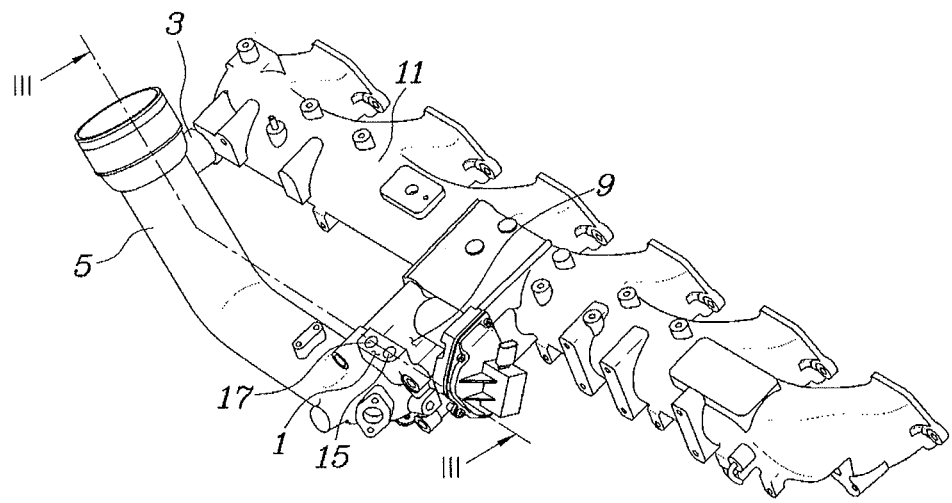
FIG. 2 is a diagram illustrating an intake pipe, a throttle body, and an intake manifold when viewed from the top of FIG. 1.
Figure 3:
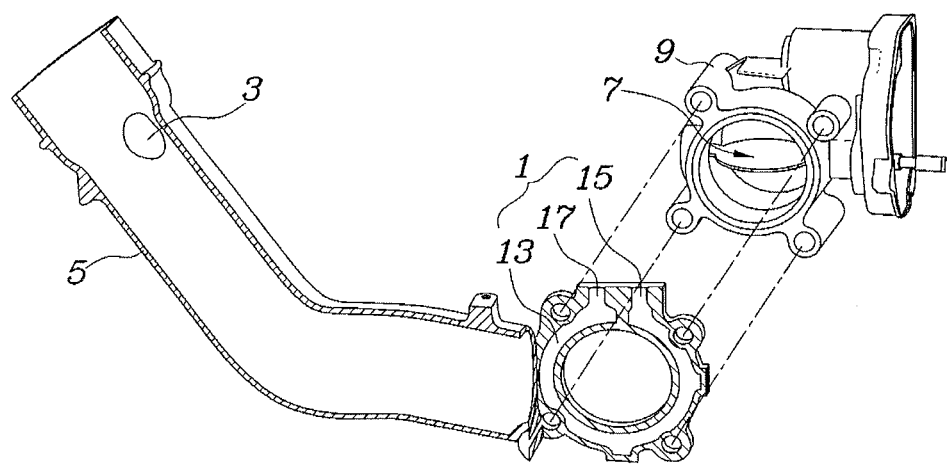
FIG. 3 is a diagram illustrating a cross section taken along the line of FIG. 2 and a state in which the throttle body is separated from the intake pipe.

As illustrated in FIG. 2 and FIG. 3, one end of the intake pipe 5 is coupled with the throttle body 9 which is provided in the throttle valve 7, the throttle body 9 is connected to an intake manifold 11 through which the received air is distributed into each combustion chamber of the engine E, and the air heater 1 is integrally formed at an end of the intake pipe 5 which is coupled with the throttle body 9.

In this configuration, the air heater 1 is configured to include a heating channel 13 which is formed in an arc shape within the end of the intake pipe 5 so as to provide a flow of cooling water while enclosing a circumference of air introduced into the throttle body 9, a supply port 15 provided at the end of the intake pipe 5 so as to supply the cooling water to the heating channel 13, and a discharge port 17 provided at the end of the intake pipe 5 so as to discharge the cooling water through the heating channel 13.

Therefore, the engine E cooling water is introduced through the support port 15 and thus passes through the end of the intake pipe 5 while flowing in the heating channel 13 to heat the air transferred to the throttle valve 7 and is discharged through the discharge port 17.

Figure 4:
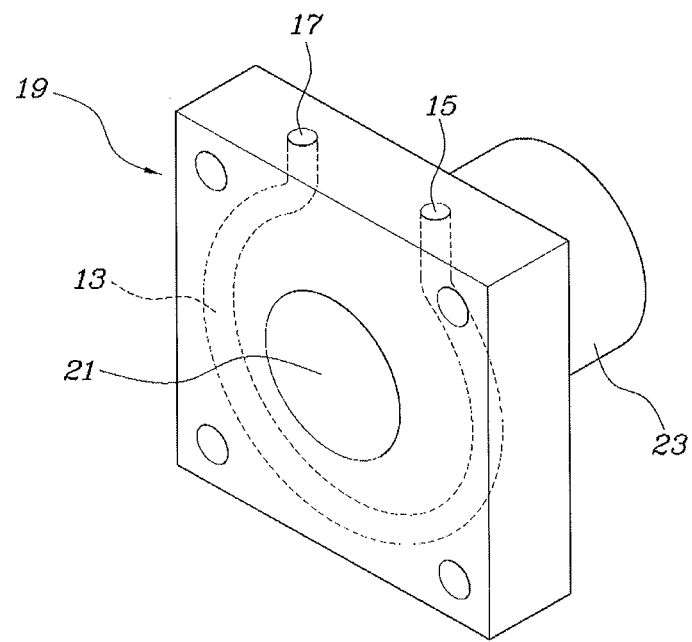
FIG. 4 is a diagram illustrating an air heater according to the present invention.

Meanwhile, the air heater 1 may be configured as a separate part as illustrated in FIG. 4 and the air heater 1 of FIG. 4 is coupled between the end of the intake pipe 5 and the throttle body 9 and is configured of a heating adapter 19 of which the center is provided with an air hole 21 through which air passes from the intake pipe 5 to the throttle body 9.

In this configuration, the heating adapter 19 is provided with the heating channel 13 so as to provide the flow of cooling water while enclosing the circumference of the air hole 21 and is provided with a support port 15 which supplies the cooling water to the heating channel 13 and a discharge port 17 which discharges the cooling water through the heating channel 13.

Further, the heating adapter 19 is integrally provided with an extending pipe 23 protruding to be inserted into the throttle body 9 from an edge portion of the air hole 21 to heat air passing through the air hole 21 over a long period of time while increasing a heat transfer to the throttle valve 7 due to conduction, thereby maximizing a heating effect of air and heating the throttle valve 7 itself.

Although not illustrated in the drawings, according to various embodiments of the air heater 1, the air heater 1 may be integrally provided at an upstream side of the throttle valve 7 within the throttle body 9.

That is, the engine E cooling water is configured to integrally include the support port, the heating channel, the discharge port, and the like as described above, to heat the air passing through the throttle valve 7 in advance while flowing in the throttle body 9 itself.

Meanwhile, the valve apparatus 30 is configured of a thermostat 31 which cuts off the cooling water discharged from the engine E through an engine passage 25 from flowing in the heat radiation passage 27 toward the radiator R when a temperature of cooling water is less than a set temperature range and cuts off the cooling water from the engine passage 25 from flowing through the bypass passage 29 for directly supplying the cooling water to the water pump (W/P) while bypassing the radiator R when a temperature of cooling water exceeds a set temperature range.

That is, a wax pellet type thermostat 31, and the like expands and contracts wax present therein depending on a temperature of cooling water without being applied with a separate control signal from a control device such as a controller to control the flow of cooling water. The various embodiments of the present invention are configured to control the flow of cooling water passing through the air heater 1, along with the thermostat 31.

That is, the thermostat 31 is generally configured to include a first valve 33 configured to cut off the heat radiation passage 27, through which the cooling water discharged from the engine E through the engine passage 25 is supplied to the radiator R, from the engine passage 25 when the temperature of cooling water is less than a set temperature range, and a second valve 35 configured to interlock with the first valve 33 and cut off the bypass passage 29, through which the cooling water discharged from the engine E through the engine passage 25 is directly supplied to the water pump W/P, from the engine passage 25 when the temperature of cooling water exceeds the set temperature range, and in addition to the components, the thermostat 31 used in various embodiments of the present invention includes a circulation port 37 configured to have an end opened on a surface of a valve seat 36 of the second valve 35 so as to transfer the cooling water discharged from the engine E through a separate passage from the engine passage 25 and make the cooling water flow in the bypass passage 29 and then to be cut off as soon as the second valve 35 cuts off the bypass passage 29.

Therefore, the thermostat 31 which is the valve apparatus 30 is formed to allow the circulation passage 39 to communicate with the surface of the valve seat 36 seated when the second valve 35 cuts off the bypass passage 29 if the second valve 35 cuts off the bypass passage 29 through which the cooling water is directly supplied to the water pump W/P when the temperature of cooling water exceeds the set temperature range, and therefore is configured to cut off the circulation passage 39 through which the cooling water passing through the air heater 1 is connected to the bypass passage 29, along with the second valve 35.

In this configuration, the circulation port 37 forms a portion of the circulation passage 39 and is an expression which represents a portion of the circulation passage 39 configured in the thermostat 31 and the circulation passage 39 means the cooling water passage which is reached from the discharge port 17 of the air heater 1 to the circulation port 37.

Meanwhile, the set temperature range of the thermostat 31 may be set to be, for example, 82° C. to 92° C. In this case, when the temperature of cooling water is less than 82° C., the first valve 33 cuts off the heat radiation passage 27 to prevent the cooling water discharged from the engine E through the engine passage 25 from being supplied to the heat radiation passage 27 and directly supplies the cooling water to the water pump W/P through the bypass passage 29 to again circulate the cooling water to the engine E, when the temperature of cooling water exceeds 82° C., the first valve 33 starts to be opened and the second valve interlocking thereto starts to be closed, and when the temperature of cooling water reaches 92° C., the second valve 35 is completely closed and thus the bypass passage 29 is cut off from the engine passage 25. According to various embodiments of the present invention, the circulation passage 39 is cut off simultaneously therewith and the flow of cooling water of the air heater 1 stops.

Figure 5:
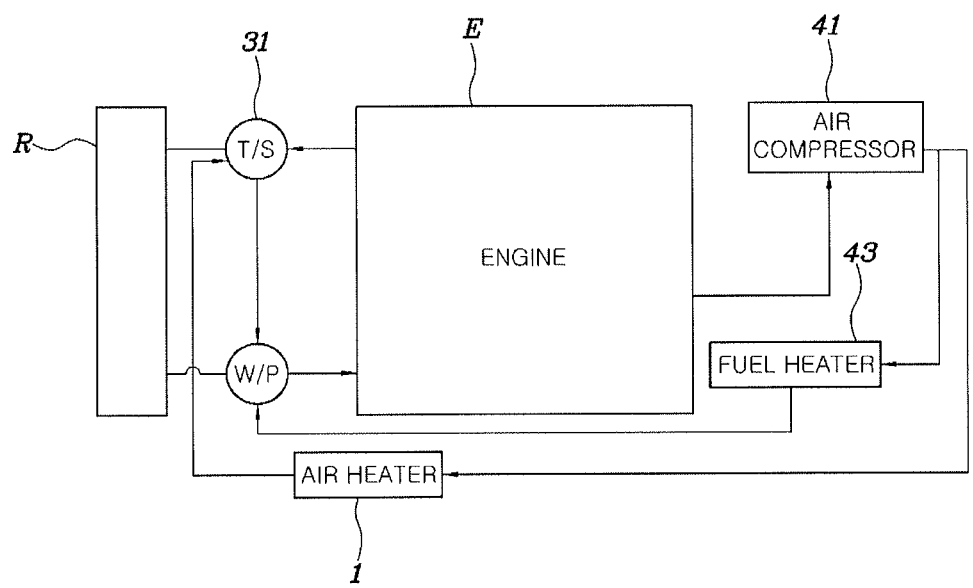
FIG. 5 is a diagram illustrating a cooling water circulating system of a CNG engine to which the present invention is applied and a state in which the air heater heats air.
Figure 6:
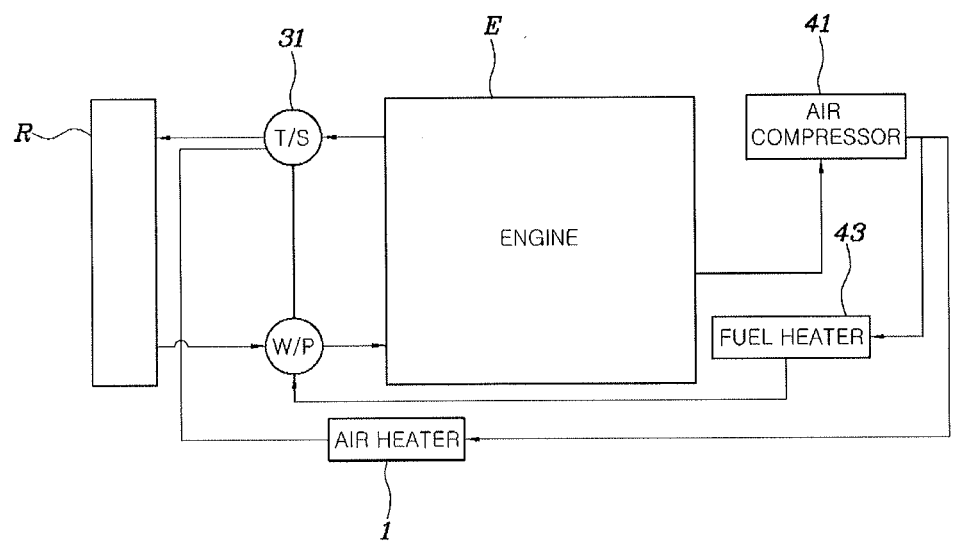
FIG. 6 is a diagram illustrating a state in which the air heater does not heat air, as compared with FIG. 5.
Figure 7:
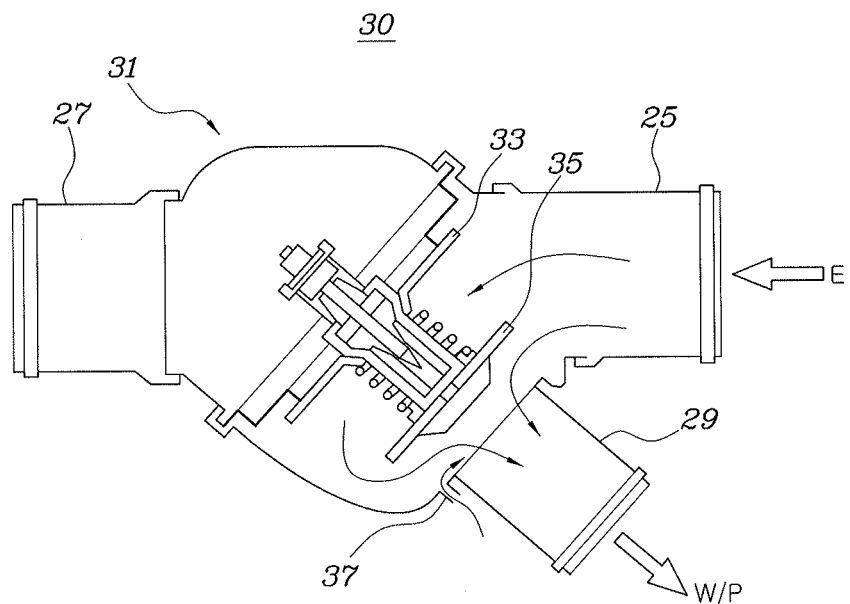
FIG. 7 is a diagram of a thermostat structure according to the present invention and illustrates a thermostat state under the situation in which the air heater heats air.
Figure 8:
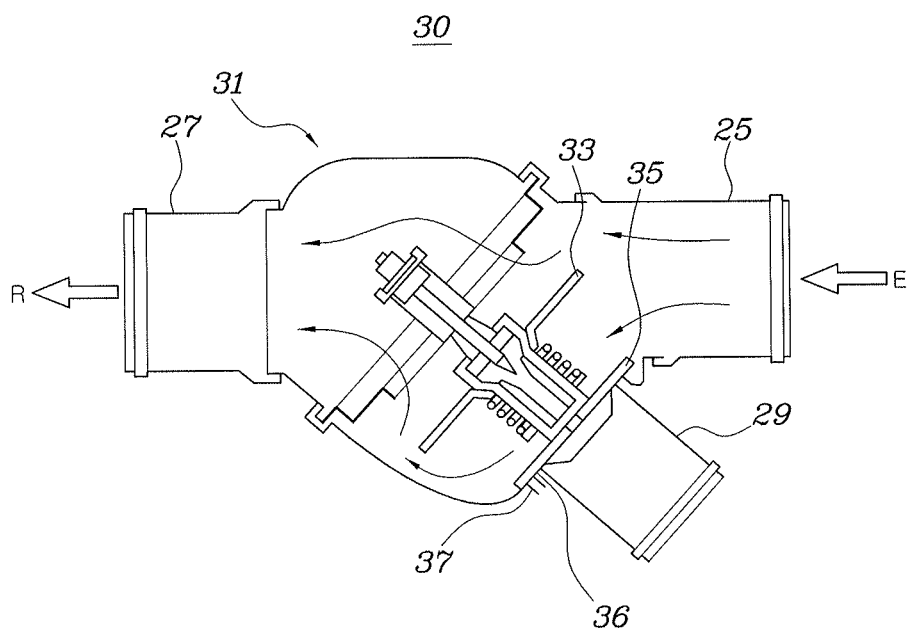
FIG. 8 is a compared diagram with FIG. 7 illustrating the thermostat state under the situation in which the air heater does not heat air.

According to various embodiments of the present invention illustrated in FIG. 1, FIG. 5, and FIG. 6, the engine E is a compressed natural gas (CNG) engine using compressed natural gas as fuel, the air heater 1 is installed to be supplied with the cooling water passing through an air compressor 41 to cool the air compressor 41 compressing air to be used in the vehicle to heat the air supplied to the throttle valve 7, the cooling water passing through the air heater 1 and the thermostat 31 which is the valve apparatus 30 is directly supplied to the water pump W/P which pumps the cooling water to the engine E, and the air compressor 41 is installed to be supplied with the cooling water passing through the engine E.

The cooling water passing through the air compressor 41 is supplied to a fuel heater 43 which heats the CNG to be supplied to the engine E, in addition to the air heater 1 and the cooling water passing through the fuel heater 43 is transferred to the water pump W/P.

An action of the present invention configured as described above will be described with reference to FIG. 5 and FIG. 6.

The state of FIG. 5 is a situation that the warm up of the engine E is not sufficiently made and moisture in the EGR gas may freeze by received cold air but illustrates a situation that the air heater 1 heats the air supplied toward the throttle valve 7 to prevent the freezing and the state of FIG. 5 is a state in which the cooling water discharged from the engine E is supplied to the water pump W/P through the bypass passage 29 and is a state in which the cooling water which is discharged from the engine E and passes through the air compressor 41 and the air heater 1 is circulated to the water pump W/P by sequentially passing through the circulation passage 39 and the bypass passage 29.

In this state, the cooling water which is supplied with heat from the engine E and is discharged is additionally supplied with heat while cooling the air compressor 41 and is heated and then is supplied to the air heater 1 to heat the air to be provided to the throttle valve 7 at a relatively higher temperature, thereby more effectively preventing the freezing problem of the throttle valve 7.

FIG. 6 illustrates a situation after the warm up of the engine E is sufficiently made. In this situation, there is no risk that the throttle valve 7 which is adjacently positioned to the engine E within an engine E room may freeze due to the heat sufficiently generated from the engine E in advance. Rather, when the air heater 1 heats an air received into the engine E, the filling efficiency of the engine is reduced and therefore FIG. 6 illustrates a situation to prevent the reduction in filling efficiency.

That is, the engine E is sufficiently warmed up to allow the second valve 35 to cut off the bypass passage 29 and under the situation that the all cooling water discharged from the engine E passes through the radiator R through the heat radiation passage 27 and then is circulated to the water pump W/P, since the circulation passage 39 is also cut off by the second valve 35, the air heater 1 is no longer supplied with the cooling water transferring heat and therefore does not heat the air supplied to the combustion chamber through the throttle valve 7.

Even in this case, however, the air compressor 41 is continuously supplied with the cooling water and thus is cooled. In this situation, the cooling water passing through the air compressor 41 is circulated to the water pump W/P through the fuel heater 43 and therefore the air compressor 41 is continuously cooled.

According to various embodiments of the present invention, it is possible to prevent the motion obstruction phenomenon of the valve flap from occurring due to moisture freezing in an engine to which EGR is applied while air mixed with EGR gas passes through a throttle valve to prevent air passing through the throttle valve from being excessively heated while securing smooth and stabilized workability of the engine, thereby preventing filling efficiency of the engine from being excessively reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A temperature control device for an engine, comprising:
    an air heater configured to heat air introduced into a throttle valve by a flow of engine cooling water; and
    a valve apparatus configured to cut off the flow of the engine cooling water passing through the air heater at a set temperature range or more, without being supplied with a separate control signal from a controller so as to cut off the flow of the engine cooling water independently from the controller,
    wherein the valve apparatus comprises a thermostat which cuts off cooling water discharged from the engine through an engine passage from flowing in a heat radiation passage toward a radiator when a temperature of the cooling water is less than the set temperature range and cuts off the cooling water from the engine passage from flowing through a bypass passage for directly supplying the cooling water to a water pump while bypassing the radiator when the temperature of the cooling water exceeds the set temperature range, and
    wherein the thermostat which is the valve apparatus is configured to cut off a circulation passage through which cooling water passing through the air heater is connected to the bypass passage when a second valve cuts off the bypass passage through which the cooling water is directly supplied to the water pump when the temperature of the cooling water exceeds the set temperature range.

2. The temperature control device for the engine of claim 1, wherein the air heater is provided between a position where an exhaust gas recirculation (EGR) passage, through which EGR gas is supplied, is connected to an intake pipe of the engine and a position where a valve flap of the throttle valve connected to the intake pipe is disposed.

3. The temperature control device for the engine of claim 2, wherein a first end of the intake pipe is coupled to a throttle body which is provided with the throttle valve therein, and
    the air heater is integrally formed at the first end of the intake pipe which is coupled to the throttle body.

4. The temperature control device for the engine of claim 3, wherein the air heater includes:
    a heating channel which is formed in an arc shape within the first end of the intake pipe so as to provide the flow of cooling water while enclosing a circumference of air introduced into the throttle body;
    a supply port provided at the first end of the intake pipe so as to supply the cooling water to the heating channel; and
    a discharge port provided at the first end of the intake pipe so as to discharge the cooling water through the heating channel.

5. The temperature control device for the engine of claim 2, wherein the air heater is coupled between an end of the intake pipe and a throttle body and includes a heating adapter of which a center is provided with an air hole through which air passes from the intake pipe to the throttle body, and
    the heating adapter is provided with a heating channel so as to allow cooling water to flow while enclosing a circumference of the air hole and is provided with a support port which supplies the cooling water to the heating channel and a discharge port which discharges the cooling water through the heating channel.

6. The temperature control device for the engine of claim 5, wherein the heating adapter is integrally provided with an extending pipe which protrudes to be inserted into the throttle body from an edge portion of the air hole to heat air passing through the air hole over a long period of time while increasing a heat transfer to the throttle valve due to conduction.

7. The temperature control device for the engine of claim 2, wherein the air heater is integrally provided at an upstream side of the throttle valve within a throttle body.

8. The temperature control device for the engine of claim 1, wherein the circulation passage is formed to communicate with a surface of a valve seat seated when the second valve of the thermostat cuts off the bypass passage.

9. The temperature control device for the engine of claim 1, wherein the engine is a compressed natural gas (CNG) engine using CNG as fuel,
   the air heater is disposed to be supplied with the cooling water passing through an air compressor to cool the air compressor compressing air to be used in a vehicle to heat air supplied to the throttle valve,
   the cooling water passing through the air heater and the valve apparatus is directly supplied to a water pump which is configured to pump the cooling water to the engine, and
   the air compressor is disposed to be supplied with the cooling water passing through the engine.

10. The temperature control device for the engine of claim 9, wherein the cooling water passing through the air compressor is supplied to a fuel heater which is configured to heat the CNG to be supplied to the engine, in addition to the air heater, and the cooling water passing through the fuel heater is transferred to the water pump.

* * * * *